United States Patent
Rogers

[19]

[11] Patent Number: 5,855,344

[45] Date of Patent: Jan. 5, 1999

[54] METHOD AND APPARATUS FOR COUNTERBALANCING

[75] Inventor: James Rogers, Irving, Tex.

[73] Assignee: Immersive Technologies, Inc., Richardson, Tex.

[21] Appl. No.: 668,259

[22] Filed: Jun. 20, 1996

[51] Int. Cl.⁶ .............................. F16L 3/00; F16M 11/00
[52] U.S. Cl. ........................ 248/123.2; 359/632; 348/49
[58] Field of Search ................ 345/7, 8, 26; 348/115; 359/630, 632; 248/123.11, 123.2, 280.11, 284.1, 292.11; 901/48; 16/400; 212/195

[56] References Cited

U.S. PATENT DOCUMENTS

| | | | |
|---|---|---|---|
| 3,784,738 | 1/1974 | Natter | 348/49 |
| 4,344,595 | 8/1982 | Heller et al. | 248/123.2 |
| 4,725,125 | 2/1988 | Ellis et al. | 359/632 |
| 4,884,219 | 11/1989 | Waldren . | |
| 5,186,422 | 2/1993 | Nakamura | 248/123.2 |
| 5,253,832 | 10/1993 | Bolas et al. . | |
| 5,414,461 | 5/1995 | Kishi et al. | 348/115 |

OTHER PUBLICATIONS

Ken Pimentel et al., *Virtual Reality, Through the New Looking Glass*, 166–172, 370–373 (2d ed. 1995).

*Primary Examiner*—Charles A. Marmor
*Assistant Examiner*—David Fenstermacher
*Attorney, Agent, or Firm*—Burns, Doane, Swecker & Mathis, L.L.P.

[57] ABSTRACT

An exemplary apparatus for counterbalancing a video display comprises a stationary housing, a boom rotatably fixed to the housing which supports the video display, a counterweight boom disposed within the housing and below the boom for counterbalancing the torque imparted on the boom by the video display, a coupling member which mechanically couples the counterweight boom to the boom such that they move in unison, and a stabilizer which limits the speed at which the boom and counterweight boom travel to prevent injury to users. The location of the counterweight boom inside the housing and below the boom results in a lower center of mass of the apparatus which significantly improves stability.

14 Claims, 6 Drawing Sheets

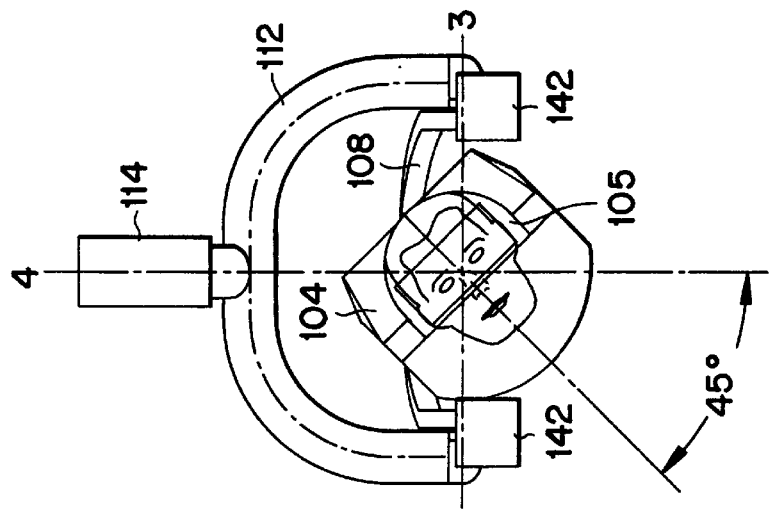
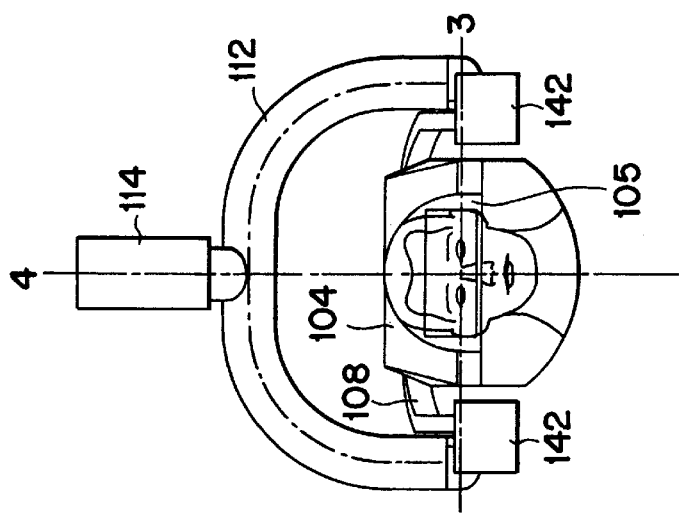
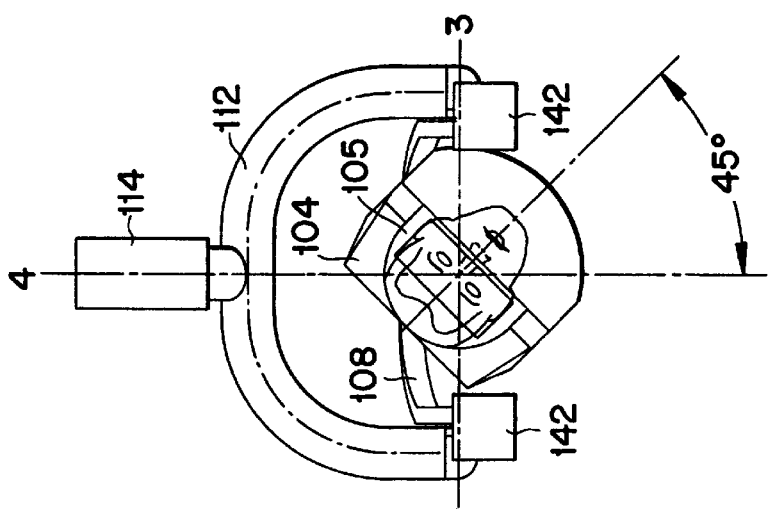

METHOD AND APPARATUS FOR COUNTERBALANCING

BACKGROUND

The present invention relates generally to a method and apparatus for counterbalancing, and more particularly to a method and apparatus for counterbalancing a moveable visual display while achieving a low center of mass.

The use of video displays for recreational, educational, and scientific purposes has increased dramatically in recent years. Video displays are commonly used in medical operations, for example, and in many other analytical fields, to visually present a simulated environment to a user. Another particular application is in the video game industry where video displays transmit real time image data to a user. The video display is programmed to respond to actions taken by the user through a control mechanism such as a joy stick and is updated in real time.

Recently, video displays have been adapted to be secured a fixed distance in front of a user's eyes and to provide real time image data based on, for example, the movement of the user's head. Commonly known as "virtual reality", a motion sensor senses movement of the user's head and provides a signal representing the motion to a microprocessor which calculates the real time image data based on the signal.

The video display, to provide real time image data, may require a considerable amount of computing power, however. Consequently, it is difficult to design a self-contained unit secured to the user's head which is not unduly burdensome. To overcome this problem, the video display may be mechanically coupled to a boom which is fixed to a stationary frame or housing in which the processor and other components are housed.

Because the video display may have a substantial mass, it imparts a significant torque on the boom, tending to rotate the boom downward about the fixed point of rotation on the housing. In known systems, the boom is typically counterbalanced by extending the boom a significant distance beyond the rotation point on the stationary frame. U.S. Pat. No. 5,253,832, for example, discloses a suspension system which includes a boom arm counterbalanced by extending the boom arm a distance beyond the pivot point sufficient to counterbalance the weight of the viewing device. This general method of counterbalancing, however, has several disadvantages.

For example, because the counterbalancing portion of the boom extends upward from the rotation point, the center of mass of the apparatus is relatively high off the ground. This creates a significant instability in the apparatus which may cause injury to a user, particularly in the video game industry where users may "manhandle" the machine. Furthermore, because the counterbalancing portion of the boom extends upward from the rotation point, it will either be exposed above the stationary housing, or the housing will need to be extended upward to enclose the counterbalancing portion of the boom. In either case, the center of mass of the apparatus may be unacceptably high. Although the cabinet may be widened to increase its stability, the extent to which it must be widened is great enough to create other disadvantages. For example, in addition to being more cumbersome and expensive, a wide cabinet may prevent the arrangement of several machines in an island configuration.

Other known booms use gas springs to apply a counterbalancing force and work well in applying small amounts of force in one direction. However, they are not very effective at achieving a state of balance.

It would be desirable, therefore, to have a counterbalancing system that would achieve a lower center of mass, which would have the ability to balance with near zero deferential between load and counterweight, and which would limit the speed of motion of the boom.

SUMMARY

According to an exemplary embodiment of the invention, a boom and counterbalancing system and method are provided to support an audio, video and/or control unit at variable elevations to compensate for user heights ranging from, for example, 4'-4" to 6'-4". The boom preferably suspends its load at a distance far enough from the cabinet to allow the user freedom of movement without contacting the cabinet. The system is stable and is designed to prevent a heavy load from moving at a high rate of speed, thus retaining its position with little effort from the user while avoiding impact injuries to users or bystanders.

According to exemplary embodiments of the invention, the boom pivots about a first axis and through a mechanical linkage which causes a counterweight boom to pivot about a second axis. This raises and lowers a counterweight suspended from the counterweight boom in an arc opposing the load at the end of the boom created by the audio, video, and control unit.

The internal counterweight boom, which is coupled to the boom by the mechanical linkage, is preferably mounted in a position inside the cabinet below the boom. This connection allows the boom and counterweight boom to move in unison and displaces a significant portion of the mass of the apparatus to a lower position in the cabinet, thus lowering the center of mass and increasing the stability of the apparatus.

The counterweight is preferably located at the back of the cabinet on a suspending rod which extends between the counterweight and the counterweight boom. This configuration further lowers the center of mass of the system by allowing the counterweight to maintain a very low elevation regardless of the position of the counterweight boom. The counterweight may also include a container which can be used to add or remove small amounts of weight to calibrate the system balance.

The overall system movement may be regulated by a motion control device, such as an extendible and compressible gas stabilizer cylinder, attached between the counterweight boom and the supporting frame or housing. The cylinder is preferably not biased in either direction, which helps the boom to maintain the load in the position selected by the user. The bidirectional motion control provided by the stabilizer cylinder provides a safety factor by limiting the impact of the load supported by the boom. The stabilizer cylinder limits the speed of travel for the entire assembly to avoid injury to users.

BRIEF DESCRIPTION OF THE DRAWINGS

The foregoing and other objects, features and advantages of the present invention will be more readily understood upon reading the following detailed description in conjunction with the drawings in which:

FIG. 3 is a side view of an exemplary counterbalancing apparatus in a configuration adapted for a short user;

DETAILED DESCRIPTION

Figure 1:
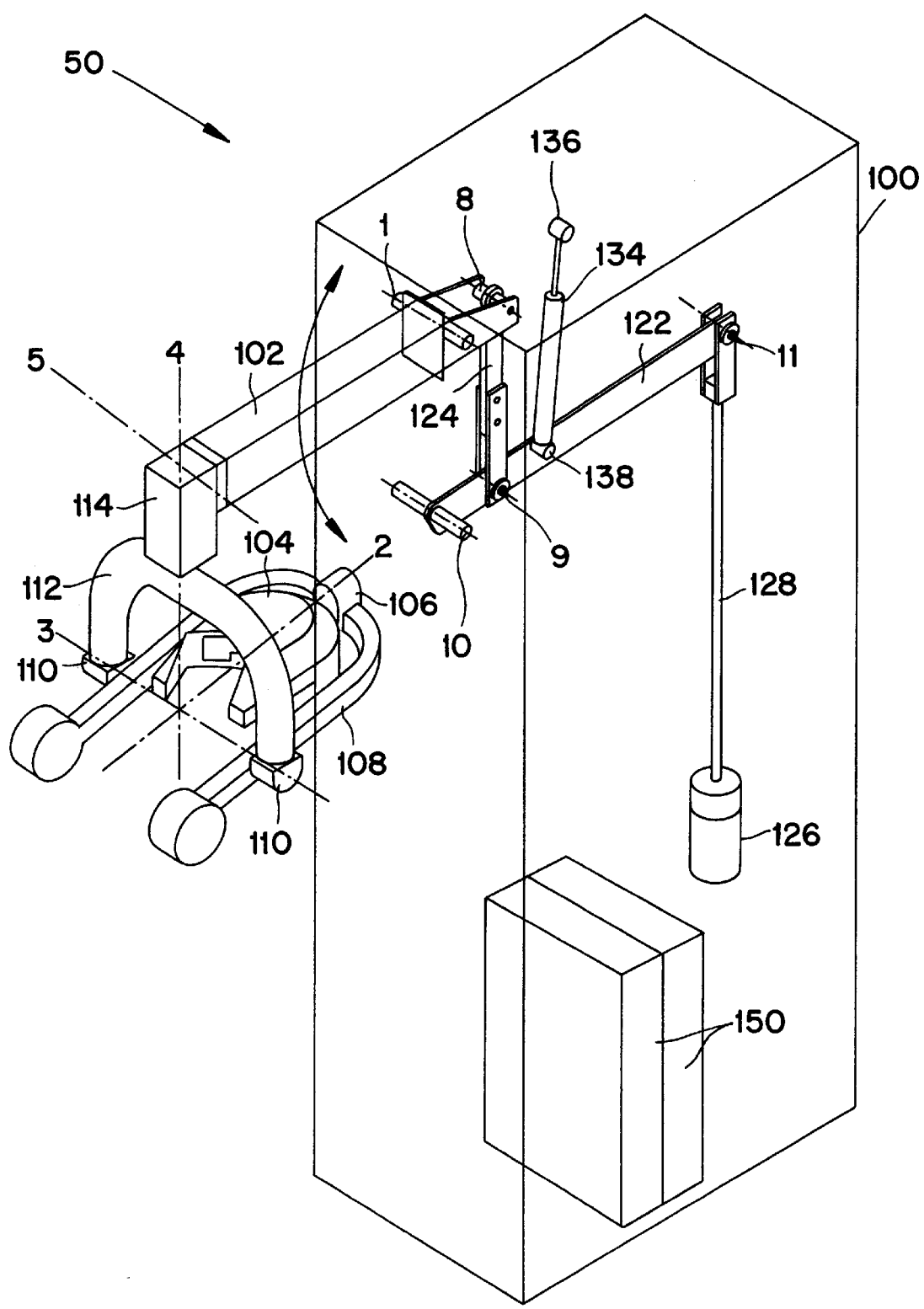
FIG. 1 is a perspective view of a counterbalancing apparatus according to an exemplary embodiment of the invention.

FIG. 1 is a perspective view of a counterbalancing apparatus according to an exemplary embodiment of the invention. The apparatus may generally comprise a stationary cabinet or supporting frame 100 which supports the moving parts of the apparatus. A boom 102 is rotatably mounted on the housing 100 at an axis of rotation 1. The boom 102 supports a display 104 or other device which transmits video, audio, and/or other data to a user. The boom 102 may extend outside the cabinet 100 to an axis 5 which rotatably connects the load to the boom 102.

In general, the counterbalancing apparatus according to exemplary embodiments of the present invention may be used with a system which includes a mechanism for sensing an orientation of the user's head and one or more processors to generate image data for each eye based on the sensed orientation. The processors can create a "virtual world" with the image data they generate. The virtual world may include stationary and moving objects, for example, with which the user interacts. The spatial coordinates of the virtual model can be recalculated in real time so that the objects in the virtual world may be perceived to move relative to the user.

According to an exemplary embodiment, two rectilinear LCD displays, each having a diagonal of approximately 5 inches, are provided in the visual display 104 to transmit images to a user. The LCD displays may substantially fill the field of vision of the user with computer-generated images. The processors are preferably programmed to generate individual image data of the virtual model for each eye of the user in accordance with sensed variations in the orientation of the user's head. The virtual model may therefore be perceived stereoscopically, which enhances the realism of the virtual model. If two processors are implemented, each processor can be dedicated to computing image data for one eye. The use of one processor for each eye can significantly improve the quality of the image data transmitted to the user.

To calculate the image data, the processors receive signals representing the roll, pitch, and yaw of the visual display 104 relative to a fixed coordinate system. This data is processed by the processors to compute a graphical representation for each eye. The data represents the orientation of the user's head with respect to the 3-dimensional world. Additional signals can be transmitted from a handle fixed to the visual display 104, which enables the user to move translationally in the virtual world, e.g., forward, backward, up, down, left, right. The additional translation movement controls can be independent of the fixed location of the visual display, and may be limited only by the definition of the virtual world.

The display 104 is preferably mechanically coupled to the boom 102 such that it has three degrees of rotational freedom. For example, the display 104 may be rotatably connected at a roll axis 2 to a bearing assembly 106. The bearing assembly 106, in addition to rotatably supporting the display 104, may also contain a sensor which senses the roll angle and which provides a signal representing the current roll angle to a processor in the cabinet 100. The bearing assembly 106 may be fixed to a pitch yoke 108 which rotates about a pitch axis 3. Two bearing assemblies 110 rotatably support the pitch yoke 108 and preferably contain a sensor which senses the current pitch angle and signals the processor accordingly. The bearing assemblies 110 connect the pitch yoke 108 to a yaw yoke 112 which rotates about a yaw axis 4. The yaw yoke 112 is mechanically coupled to the boom 102 through a bearing assembly 114 which preferably contains a sensor for sensing the yaw angle and for signaling the processor. Further details of a three degree of rotational freedom display are disclosed in commonly-owned U.S. application Ser. No. 08/667815, filed on the same date as the present application, entitled "Method and Apparatus for Orientation Sensing", which is hereby incorporated by reference.

Figure 2:
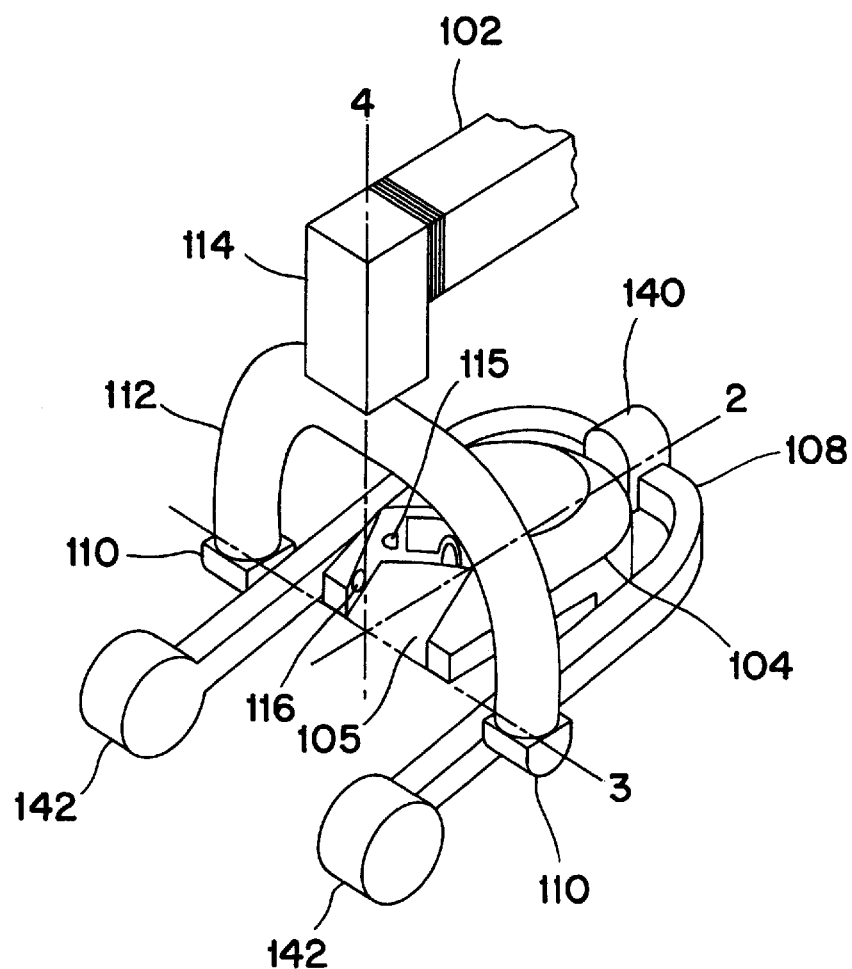
FIG. 2 is a side view of an exemplary counterbalancing apparatus in a configuration adapted to a user of medium height.

As shown in FIG. 2, the bearing assembly 114 is preferably maintained in a vertical orientation. This may be accomplished with a linkage rod 116 encased within the boom 102, as shown in the cutaway view of FIG. 2. The linkage rod 116 is connected at one end to the bearing assembly 114 at a horizontal axis 6 which is parallel to and below axis 5. The other end of the linkage rod 116 is connected at an axis 7 to a bracket 118 which is fixed in the cabinet 100. Thus, when the boom 102 is raised or lowered, the linkage rod 116 remains parallel to the boom 102. Also, because the axis 7 is fixed below the axis 1, the linkage rod 116 will ensure that the axis 6 remains fixed below the axis 5, thus maintaining the bearing assembly 114 in a vertical orientation. A rubber boot 120 covers the pivot point between the boom 102 and the bearing assembly 114. A similar rubber boot covers the area where the boom 102 enters the cabinet 100. Because the linkage rod 116 is encased within the boom 102, there is no concern with the user being pinched when the boom 102 is moved up or down.

Figure 4C:
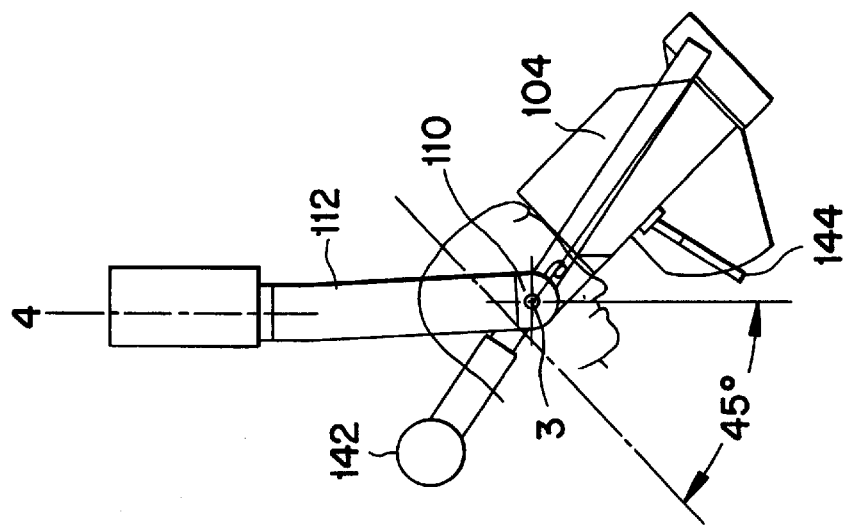
FIG. 4 is a side view of an exemplary counterbalancing apparatus in a configuration adapted for a tall user.
Figure 4B:
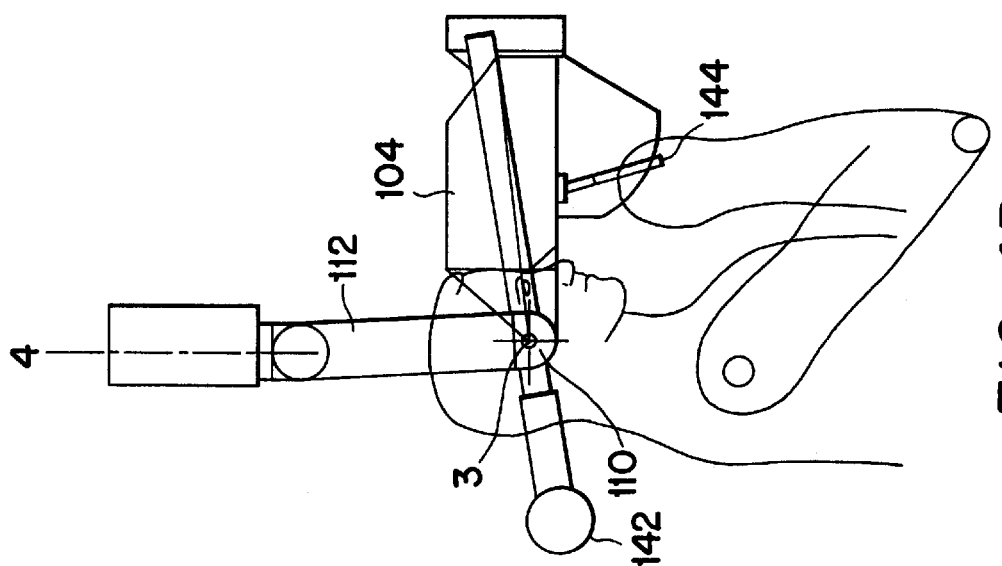
Figure 4A:
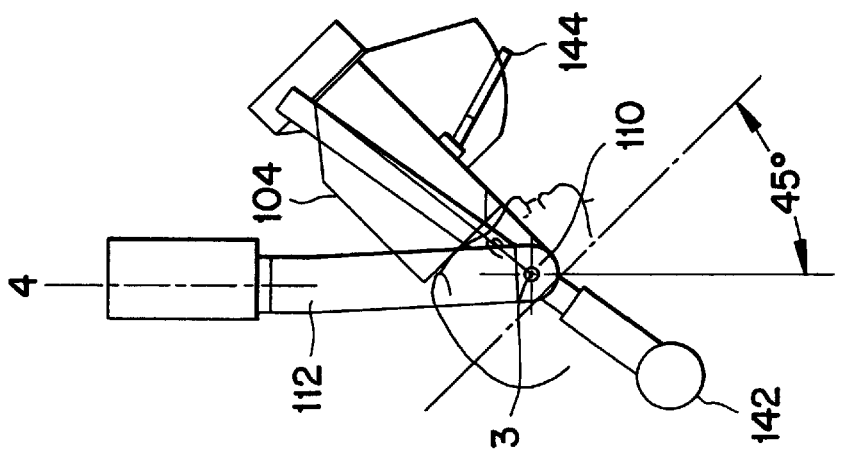

A coupling member 124 is provided to mechanically couple the boom 102 to the counterweight boom 122. The coupling member 124 is connected to the boom 102 at an axis 8 and to the counterweight boom at an axis 9. The counterweight boom 122 is also rotatably mounted at an axis 10 to the cabinet or housing 100 or to a supporting frame inside the cabinet 100. This configuration causes the counterweight boom 122 to maintain the same angular position as the boom 102, as illustrated in FIGS. 3 and 4. According to a preferred embodiment, the boom 102 and counterweight boom 122 are connected to the cabinet 100 with pins only at axes 1 and 10. This allows the entire assembly, including the boom 102, counterweight boom 122, coupling member 124, etc. to be easily installed or replaced.

A counterweight 126 may be attached to the counterweight boom 122 at an axis 11. This locates the counterweight 126 at the back of the cabinet 100 which has two advantages. First, the length of counterweight boom 122, which may be greater than the length of the boom 102, is extended, which increases the torque about axis 10 provided by the counterweight 126. Second, locating the counterweight 126 at the back of the cabinet 100 provides additional space for components such as processors 140. The counterweight 126 may be suspended from the counterweight boom 122 with a suspension rod 128 at axis 11. This will allow the counterweight 126 to be located at the lowest possible elevation in the cabinet 100, resulting in a lower center of mass of the cabinet 100.

As shown in FIG. 4, when the boom 102 is at its highest position it will contact a rubber stop 130 to limit the range of motion of the boom 102 and to prevent any damage to components of the apparatus or to users. When the boom 102 travels to its lowest position, as shown in FIG. 3, it will contact a rubber stop 132 to limit the range of motion in the downward direction. To limit a rotational velocity of the boom 102 and counterweight boom 122, a stabilizing device may be provided. As shown in FIGS. 2–4, a stabilizer 134, such as a gas stabilizer cylinder, may be connected at one of its ends 136 to the stationary housing and at the other end 138 to the counterweight boom 122. The stabilizer 134 preferably has a unbiased resistance to extension and contraction of its length. The resistance of the stabilizer 134 is also preferably dependent on the speed at which it is extended or compressed. For example, the stabilizer 134 may have a small resistance at low speeds but a much higher resistance at higher speeds, which functions to effectively limit the speed at which the moving parts of the apparatus can move.

Figure 5:
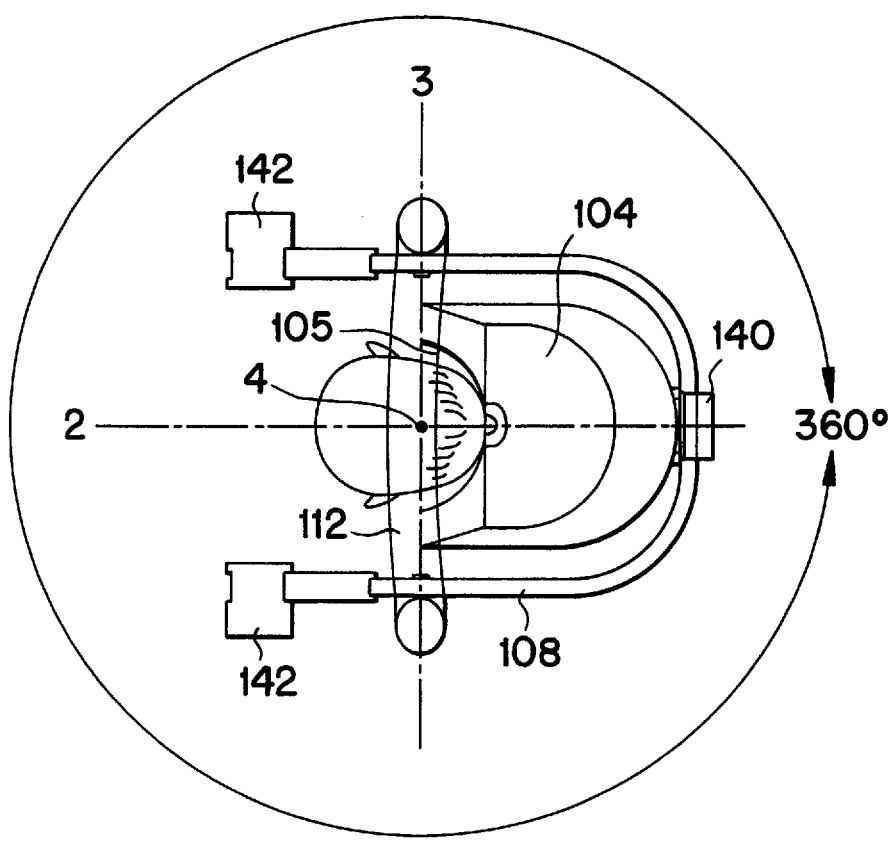
FIG. 5 is a top view of an exemplary counterbalancing apparatus which includes a stabilizing platform.
Figure 6:
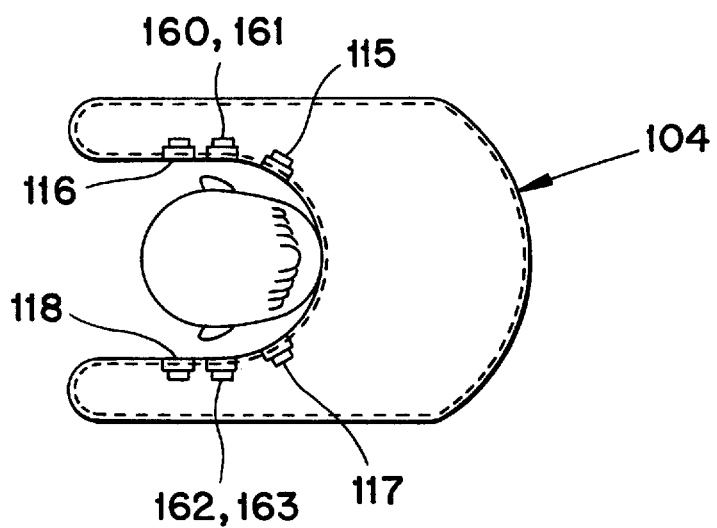
FIG. 6 is a side view of an exemplary counterbalancing apparatus which includes the stabilizing platform of FIG. 5.

According to another aspect of the invention, an added measure of stability to the cabinet 100 can be provided with a stabilizing platform. As shown in FIGS. 5 and 6, a platform 150, upon which the user stands, may be rigidly connected to the base of the cabinet 100. The platform 150 may have a generally circular shape as shown in FIG. 5 to allow the user to rotate 360° about the yaw axis. At the periphery of the platform 150, a transition region 152 gradually slopes to floor level so that users do not trip on the platform 150. The platform 150 may be constructed to taper to the width of the cabinet 100 at the point where the platform 150 meets the front of the cabinet 100. Because the user stands on the platform 150 while using the apparatus, and because the platform 150 is preferably rigidly connected to the cabinet 100, an added measure of stability is provided. The platform 150 is preferably constructed to be easily removable from the cabinet 100 to facilitate shipping or moving of the apparatus.

As will be appreciated by those skilled in the art, exemplary embodiments of the present invention can provide significant advantages in the suspension of a viewing display from a cabinet. For example, locating the counterweight boom inside the cabinet and below the boom lowers the center of mass of the apparatus and prevents the counterweight boom and other parts from being exposed. It also frees up space on top of the cabinet 100 for a monitor 154 (see FIG. 6) which may be used, for example, to attract customers. Suspending the counterweight a distance below the counterweight boom further lowers the center of mass of the apparatus. In addition, the stabilizer provides the advantage that the maximum speed at which the boom moves is limited, so that users and bystanders are not harmed. Because the center of mass of the apparatus is significantly lowered, the stability of the apparatus is greatly enhanced. This in turn allows the dimensions of the cabinet, particularly the width 142 (see FIG. 1) to be reduced, for example, to 24 inches. The reduced width allows a number of machines to be conveniently arranged in an island configuration. For ease of access, the processors 140 may face a side of the apparatus, as shown in FIG. 6. This allows a technician to easily repair reprogram, or replace one or both processors 140.

Another advantage provided by exemplary embodiments of the present invention relates to the balancing of the visual display 104 by the boom 102 and counterweight boom 122. Because the visual display 104 is supported by the boom 102 and not by the user, the mass of the visual display 104 does not have to be kept to a minimum, as in conventional helmet-type designs. This allows for the utilization of relatively large LCD displays in the visual display 104. For example, rather than being limited to lightweight LCD displays having a diagonal of less than an inch, exemplary embodiments of the present invention allow much larger LCD displays to be used, for example LCD displays having a diagonal of 2, 3, 4, 5 or more inches. The use of larger LCD displays greatly increases the satisfaction of the user because the large LCD displays occupy a much larger portion of the user's field of vision.

The support of the visual display 104 by the boom 102 provides the additional advantage that the apparatus can be left unattended without risk of damage to the apparatus. The visual display 104 is preferably securely attached to the boom 102 via the pitch yoke 108, yaw yoke 112, and bearing assembly 114. In addition, the velocity of the boom 102 may be limited by the stabilizer cylinder 134. These features can prevent the visual display 104 from being moved in a manner which would damage the visual display 104. Consequently, the apparatus can be installed at a variety of locations without the need for an attendant.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. An apparatus comprising:

a visual display;

a stationary frame;

a first boom mechanically coupled to the visual display and rotatably connected to the stationary frame;

a coupling member having a first end which is rotatably connected to the first boom; and a second boom rotatably connected to the stationary frame and rotatably connected to a second end of the coupling member said second boom having a weight connected thereto for counterbalancing said visual display.

2. The apparatus of claim 1, further comprising a housing which encloses the coupling member and the second boom.

3. The apparatus of claim 1, further comprising a stabilizer, connected to the second boom, for limiting a velocity of the second boom.

4. The apparatus of claim 3, wherein the stabilizer comprises a gas stabilizer cylinder.

5. The apparatus of claim 1, wherein said weight is suspended a predetermined distance below the second boom such that a center of mass of the apparatus is lowered.

6. The apparatus of claim 1, further comprising means for varying a mass of the weight.

7. The apparatus of claim 1, further comprising a platform, rigidly connected to the stationary frame, upon which a user stands.

8. The apparatus of claim 7, wherein the platform is removably attached to the stationary frame.

9. A method of movably connecting a visual display comprising the steps of:

mechanically coupling the visual display to a first end of a first boom;

rotatably mounting the first boom to a stationary frame at an intermediate location of the first boom; and mechanically coupling a second end of the first boom to a second boom at an intermediate location of the second boom, wherein a first end of the second boom is rotatably mounted to the stationary frame.

10. The method of claim 9, further comprising the step of fixing a weight to a second end of the second boom.

11. The method of claim 10, further comprising the step of suspending the weight a predetermined distance below the second boom such that a center of mass of the apparatus is lowered.

12. The method of claim 10, further comprising the step of varying the mass of the weight such that a torque imparted by the visual display on the first boom is reduced substantially to zero.

13. The method of claim 9, further comprising the step of limiting a rotational velocity at which the first boom moves.

14. The method of claim 9, further comprising the step of enclosing the second boom within a cabinet of the apparatus.

\* \* \* \* \*